United States Patent [19]
Lallament

[11] Patent Number: 6,036,238
[45] Date of Patent: Mar. 14, 2000

[54] DOUBLE STROKE OVER CENTER LATCH

[75] Inventor: Michael K. Lallament, Witchita, Kans.

[73] Assignee: The Boeing Company, Seattle, Wash.

[21] Appl. No.: 08/773,727

[22] Filed: Dec. 21, 1996

Related U.S. Application Data

[60] Provisional application No. 60/029,682, Oct. 30, 1996.

[51] Int. Cl.⁷ .................................................. E05C 1/06
[52] U.S. Cl. ................................. 292/100; 292/DIG. 31; 292/139
[58] Field of Search ............................. 292/97, 100, 139, 292/247, 250, DIG. 31, DIG. 49

[56] References Cited

U.S. PATENT DOCUMENTS

| | | | |
|---|---|---|---|
| Re. 31,935 | 7/1985 | Poe | 292/113 |
| 2,695,803 | 11/1954 | Summers | 292/DIG. 31 |
| 2,703,431 | 3/1955 | Tatom | 292/DIG. 31 |
| 3,237,978 | 3/1966 | Swanson | 292/247 X |
| 4,053,177 | 10/1977 | Stammreich et al. | 292/DIG. 49 |
| 4,220,364 | 9/1980 | Poe | 292/341.18 |
| 4,318,557 | 3/1982 | Bourne et al. | 292/113 |
| 4,365,775 | 12/1982 | Glancy | 244/53 |
| 4,385,423 | 5/1983 | Vermilye | 24/71 T |
| 4,531,769 | 7/1985 | Glancy | 292/113 |
| 4,538,843 | 9/1985 | Harris | 292/113 |
| 4,679,750 | 7/1987 | Burhans | 244/129.4 |
| 4,826,221 | 5/1989 | Harmon | 292/167 |
| 4,828,299 | 5/1989 | Poe | 292/139 |
| 5,011,200 | 4/1991 | Glancy et al. | 292/113 |
| 5,138,753 | 8/1992 | Sanharib . | |
| 5,152,559 | 10/1992 | Henrichs | 292/113 |
| 5,556,142 | 9/1996 | Zankich | 292/101 |

FOREIGN PATENT DOCUMENTS

| | | | |
|---|---|---|---|
| 962416 | 11/1943 | France . | |
| 2 624 905 | 12/1988 | France . | |
| 608369 | 9/1948 | United Kingdom | 292/250 |

*Primary Examiner*—Micheal F. Trettel
*Attorney, Agent, or Firm*—Bernard A. Donahue; Mary Y. Redman; Lawrence A. Nelson

[57] ABSTRACT

A latch for a thrust reverser duct on an aircraft engine. The latch accomplishes work during both the closing stroke and the handle folding stroke. An outer handle 100 release trigger 112 can lock an outer handle 100 to an inner handle 60 to fix the relative position of the outer handle 100, the inner handle 60, an idler link 80, a rocker link 78 and a secondary link 75. While they are in fixed position, the parts act as a closing handle unit 125 during the closing stroke. Once the closing stroke is completed, the inner handle 60 is locked into a fixed position with hook arm 40 and a primary link 70. The outer handler release trigger 112 can then be disengaged and the secondary link 75, the rocker link 78 and the idler link 80 work to provide mechanical advantage during the folding of the outer handle 100.

5 Claims, 9 Drawing Sheets

DOUBLE STROKE OVER CENTER LATCH

This application claims benefit of provisional application 60/029,682, filed Oct. 30, 1996.

BACKGROUND OF THE INVENTION

1. Field of the Invention

This device relates to an improved latch for securing together two members and more particularly, but not by way of limitation, to a latch for securing together a pair of hinged cowlings or ducts of an aircraft nacelle

2. Background Information

Modern jet engines commonly include a pair of thrust reverser ducts or cowls that, during aircraft operation, define the outer walls of the engine exhaust nozzle. Such thrust reverser ducts must be capable of withstanding considerable loads caused by the high pressure of the jet exhaust stream, which it contains. The thrust reverser ducts are normally hingedly connected to the upper portion of the nacelle near the point where the nacelle is attached to the engine support strut. The ducts can be pivoted upwards about their hinge points to provide access to the engine for maintenance and repair. For aircraft operation, the ducts are pivoted downwards into closed positions in which their lower ends are adjacent to one another, or adjacent to an interposed strut, services channel or bifurcation. The closed ducts are then secured by latches to form a continuous circumferential load bearing structure.

The design of latches for thrust reverser ducts is complicated by a number of factors. For example, thrust reverser ducts must have an appreciable thickness to accommodate flow reversing cascades, and the inner surfaces of the ducts must include a load bearing member or ring to withstand the aforementioned loads due to internal pressure. Furthermore, a large circumferential force must be applied during latching to ensure satisfactory flange seating.

Prior to the latch of this invention, existing latches were standard over center latches with a sliding hook arm and a folding handle. The entire take-up was accomplished in a single closing stroke followed by a folding stroke which was used solely to secure and stow the handle. The existing latches have had to compromise between the handle force necessary to close the latch and the length of the take-up stroke. For instance, the need has been to have a latch wherein typically fifty pounds (50 lbs.) of handle operating force would allow for a take-up of typically two and a half inches (2.5 inches) within a limited operating envelope that limits handle size. The problem has traditionally been resolved by allowing increased handle operating force or reduced take-up stroke. In some instances, a force of one hundred thirty pounds (130 lbs.) was required. The existing latch does not accomplish any work during handle folding, so all of the take-up must be accomplished in a single take-up stroke.

SUMMARY OF THE INVENTION

The latch of this invention incorporates an improved latch which allows the take-up to occur over both the closing stroke and the folding stroke by adding additional links which allow the action of folding the outer handle to also accomplish work. The improved latch incorporates a second over center linkage into the latch in addition to a first over center linkage.

The first stroke of the latch, or the closing stroke, operates in the same fashion as the original design but only accomplishes a portion of the total required take-up with the primary link and the inner handle being over center to engage the inner handle trigger. The outer handle release trigger prevents the relationship between the outer handle, the inner handle, the idler link, the rocker link and the secondary link from changing as the inner handle is rotated about the hook arm pivot. The second stroke of the latch, or the folding stroke, is initiated by depressing the outer handle release trigger and rotating the outer handle about the outer handle pivot towards the hook arm pivot.

The mechanical advantage of the outer handle is transmitted through the idler link into the rocker link and the secondary link. Additional mechanical advantage is gained at the rocker link to secondary link connection as they are positioned over center. The first detent position of the outer handle release trigger holds the outer handle, the idler link, the rocker link and the secondary link in the over center position. The second over center action provides the final take-up to achieve the desired total take-up. Both strokes are accomplished with a handle force lower than previously achieved by operating over two smaller strokes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF A PREFERRED EMBODIMENT

Figure 1:
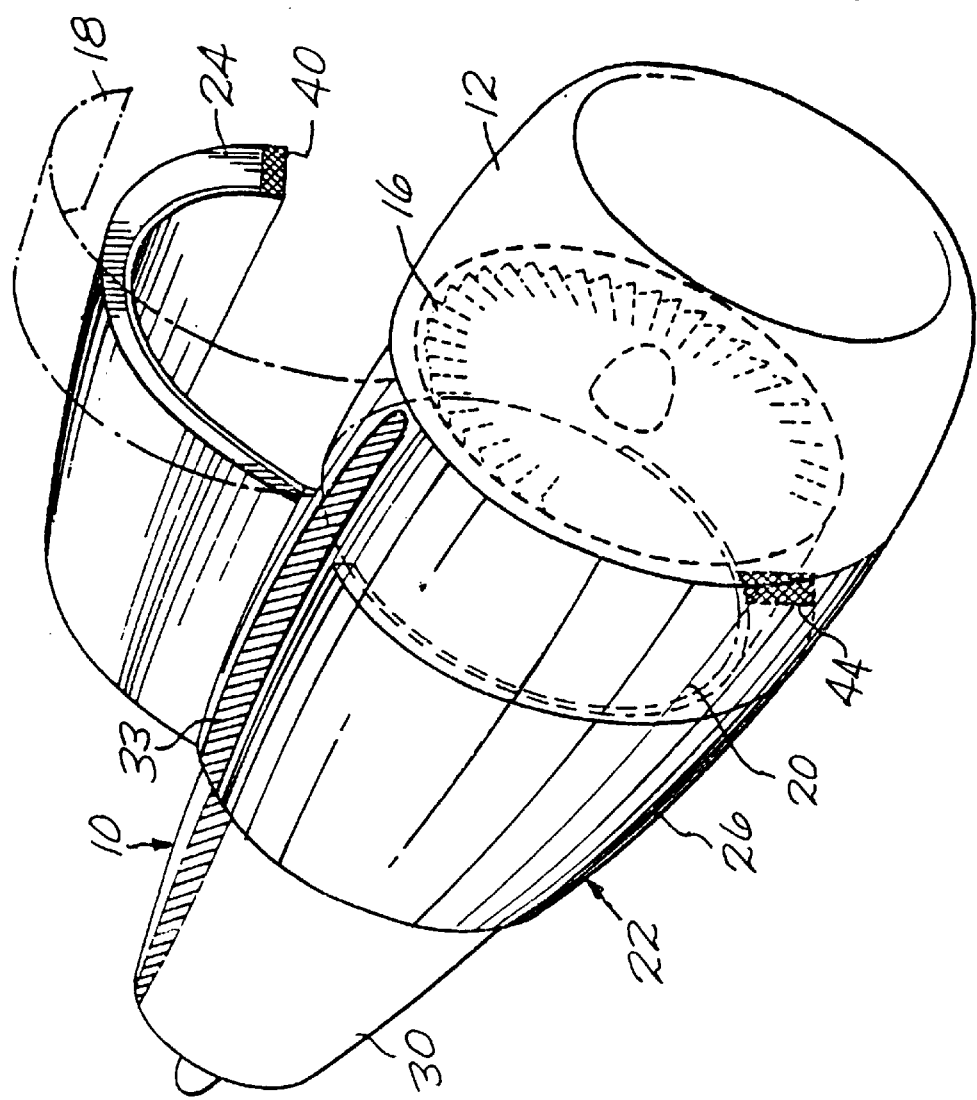
FIG. 1 is a perspective view of an aircraft engine nacelle.

Referring initially to FIG. 1, a jet engine nacelle 10 is shown comprising an inlet assembly 12, thrust reverser assembly 22, core assembly 30 and fan cowls 18 and 20. A fan 16 is part of the jet engine and is shown for reference. Each fan cowl 18 and 20 is capable of being moved between an open, maintenance position, as illustrated by fan cowl 18, and a closed, operating position, as illustrated by fan cowl 20. Both fan cowls pivot about hinge points near the upper portion of nacelle 10.

The thrust reverser assembly 22 comprises the thrust reverser ducts 24 and 26. Each thrust reverser duct is capable of being moved between an open, maintenance position, as illustrated by the thrust reverser duct 24, and a closed, operating position, as illustrated by the thrust reverser duct 26. During normal aircraft engine operation, the fan 16 forces air through an exhaust nozzle (not shown) formed between the closed reverser ducts and the core assembly 30. During reverse thrust operation, this airflow is interrupted, and the air is instead forced through a plurality of flow reversing cascades (not shown) in the thrust reverser ducts. In either instance, the thrust reverser ducts 24 and 26 are subjected to substantial hoop loads caused by high pressure air flowing therein, and the system for latching the thrust reverser ducts in their closed positions must be adapted to withstand and transmit such loads. However, the system for latching the thrust reverser ducts 24 and 26 needs to be accessible. During inspection and maintenance, it is necessary for the thrust reverser 24 and 26 ducts to be unlatched so that they can be opened in order to access the engine. It is also necessary for the latches to be closed again after inspection. So, it is necessary to have a latch which is capable of withstanding and transmitting the substantial loads produced by the air flowing within the aircraft engine, and yet be readily operable, both during engagement and disengagement.

Figure 2:
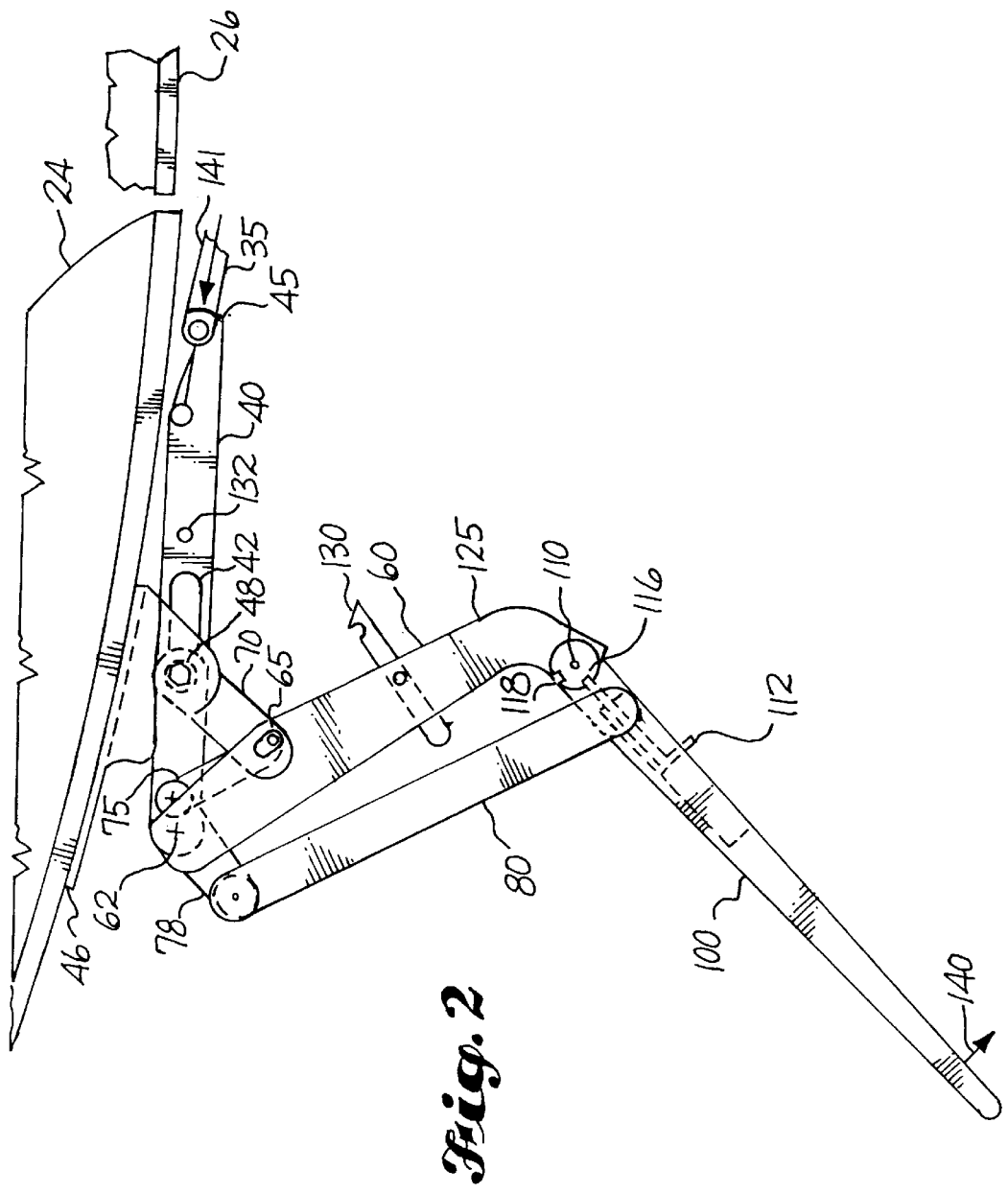
FIG. 2 is a rear elevational view of a latch in a fully opened position.

Referring now to FIG. 2 which shows an embodiment of the latch according to this invention in a fully opened position. A keeper 35 is attached (due to the scale the attachment is not shown) to a duct 26, shown on the right in the figures. A hook arm 40 has a slot 42 and a hook 45. The hook arm 40 is slidably mounted over a bolt 48 attached to a mounting base 46 on duct 24, shown on the left in the figures, such that the slot 42 is mounted over the bolt 48. The mounting base 46 and the keeper 35 may be either mounted directly to the ducts 24 and 26 or to hoops (not shown). The hook 45 is adapted to engage the keeper 35. Either the hook arm 40 or the keeper 35 will typically have a preload and a preload adjustment, not shown, that is well known. While reference is made to a hook, one skilled in the art will know of additional devices which can be used to engage the keeper.

An inner handle 60 is pivotally connected at one end to the hook arm 40 at the hook arm pivot 62. The inner handle has a slot 65.

A primary link 70 is pivotally connected at one end to the bolt 48. The opposite end is pivotally connected to the inner handle 60 and slidably engaged in the slot 65. A secondary link 75 is pivotally connected to the primary link 70 and is also slidably engaged in the slot 65. A rocker link 78 is pivotally connected to the hook arm pivot 62 and pivotally connected to the secondary link 75 at the end of the secondary link opposite the connection to the primary link 70. The connection between the rocker link 78 and the secondary link 75 is shown to the left of the hook arm pivot 62. An idler link 80 is pivotally connected to the rocker link 78 shown to the left of the hook arm pivot 62, and on the opposite side of the hook arm pivot 62 from the connection to the secondary link 75. An outer handle 100 is pivotally connected to the idler link 80. The outer handle 100 is also pivotally connected to the inner handle 60 at the handle pivot 110.

A first overcenter linkage is formed by the inner handle 60 pivotally attached to an end of the hook arm 40 opposite the keeper 35 and the primary link 70 attached to the base 46 and the inner handle 60. A second over center latch is formed by the outer handle 100 pivotally connected to the inner handle 60, an idler link 80 connected to the outer handle 100, a rocker link 78 pivotally connected to the inner handle 60 and the hook arm 40 and a secondary link 75 pivotally connected between the rocker link 78 and the primary link 70.

Figure 3:
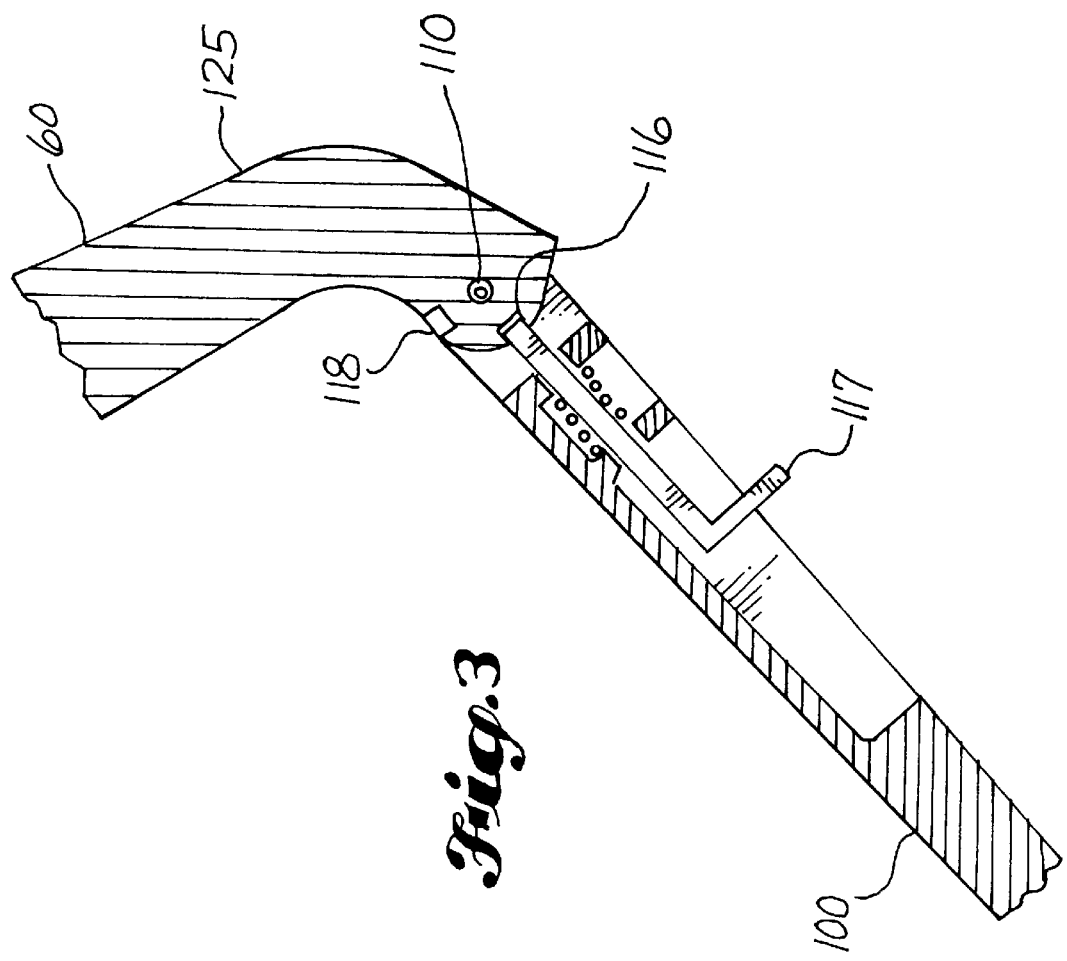
FIG. 3 is a cut away view of an outer handle trigger.

An outer handle trigger 112 is located within the outer handle 100. Referring to FIG. 3, the outer handle trigger 112 can lockingly engage in detents 116 and 118 of the inner handle 60. Referring again to FIG. 2, when the outer handle trigger 112 is engaged with the detent 116, the relationship between the outer handle 100, the inner handle 60, the idler link 80, the rocker link 78 and the secondary link 75 is fixed, so that the entire set of fixed handles and links acts as a single unit, referred to as the closing handle unit 125.

An inner handle trigger 130 is mounted to the inner handle 60 and engages with a pin 132 on the hook arm 40 when the inner handle 60 completes the closing stroke.

Figure 9:
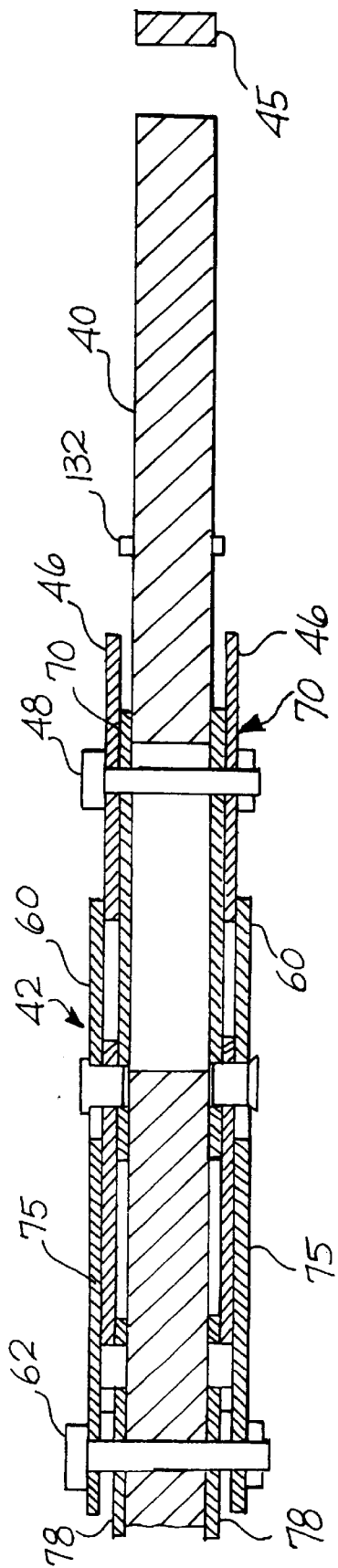
FIG. 9 is a sectional view of the a balanced latch.

Referring to FIG. 9, showing a cross section of a portion of the latch, notice that in a preferred embodiment of the latch, the link elements are balanced such that the mounting base 46 extends on both sides of the hook arm 40 and the primary link 70. The primary link 70, the inner handle 60, the secondary link 75 and the rocker link 78 are also on both sides of the hook arm 40. The remaining link elements may also be balanced about the hook arm. By balancing the link elements, the out of plane loads are reduced or eliminated, which reduces or eliminates bending moments or torsional loads. Bending moments or torsional loads may increase the amount of force needed to close the latch so reducing or eliminating them allows for more efficient use of mechanical advantage. Although it is preferred to use balanced links, the present invention may be constructed without balanced links.

Figure 4:
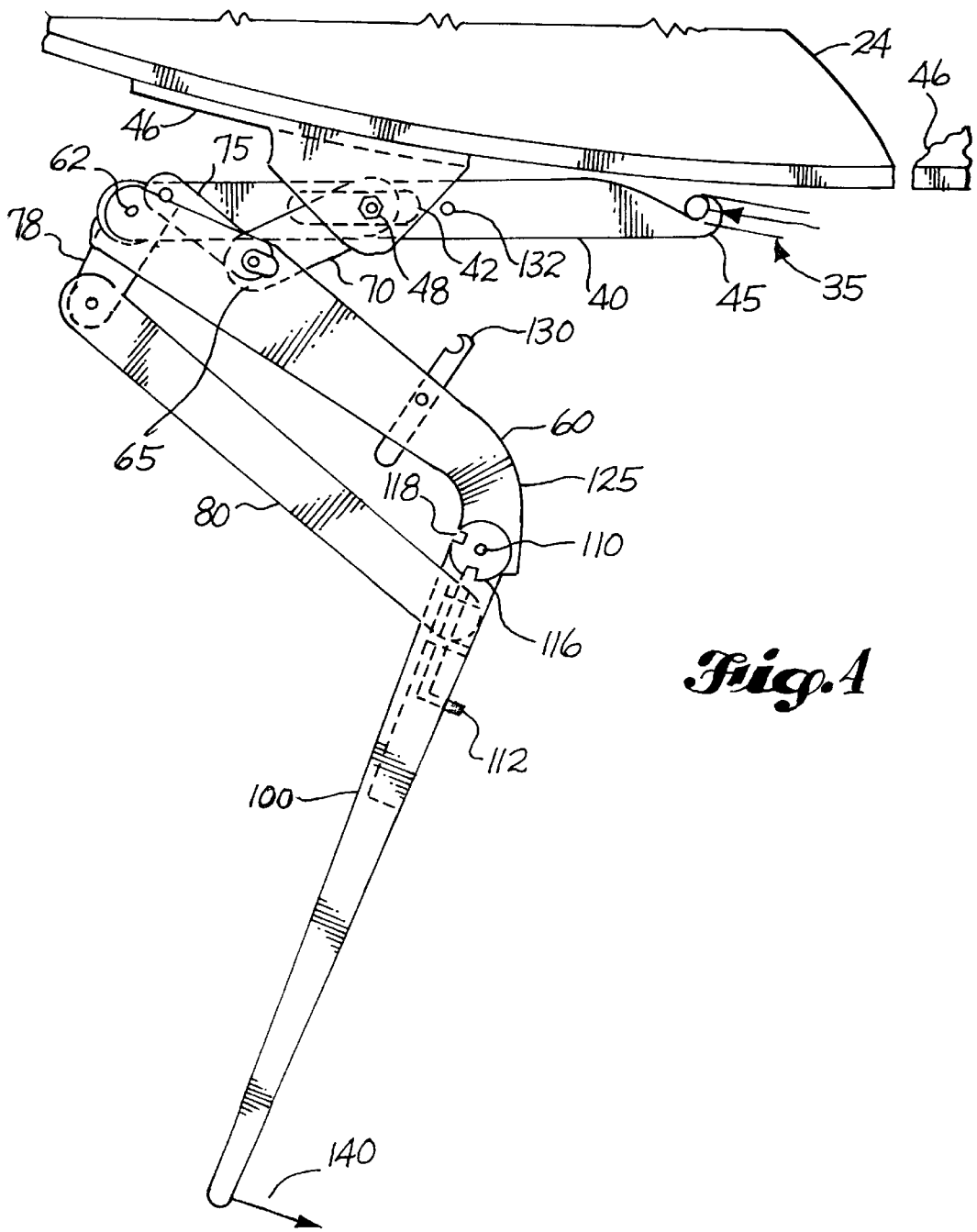
FIG. 4 is a rear elevational view of a latch in partially closed position during the closing stroke.

Referring back to FIG. 2, during a closing operation, the cowlings or ducts 24 and 26 are closed and the hook 45 is engaged with the keeper 35. During the closing stroke, the outer handle release trigger 112 is engaged with the first detent 116 in the inner handle 60, which locks the outer handle 100, the inner handle 60, the idler link 80, the rocker link 78 and the secondary link 75 to form the closing handle unit 125. The closing handle unit 125 moves as a single unit when the outer handle release trigger 112 is engaged in the first detent 116. As the closing handle is moved toward the right, in a counter-clockwise direction, as shown by the arrow 140 in FIG. 2, the hook arm 40 is forced to the left as shown by arrow 141 drawing the keeper 35 along to the left. Referring to FIG. 4, the primary link 70 is fixed to the bolt 48, so the hook arm 40 moves slidably to the left such that the slot 42 travels over the bolt 48 until the primary link 70 is substantially parallel and in line with the hook arm 40, and the inner handle release trigger 130 engages the pin 132 on the hook arm 40.

Figure 5:
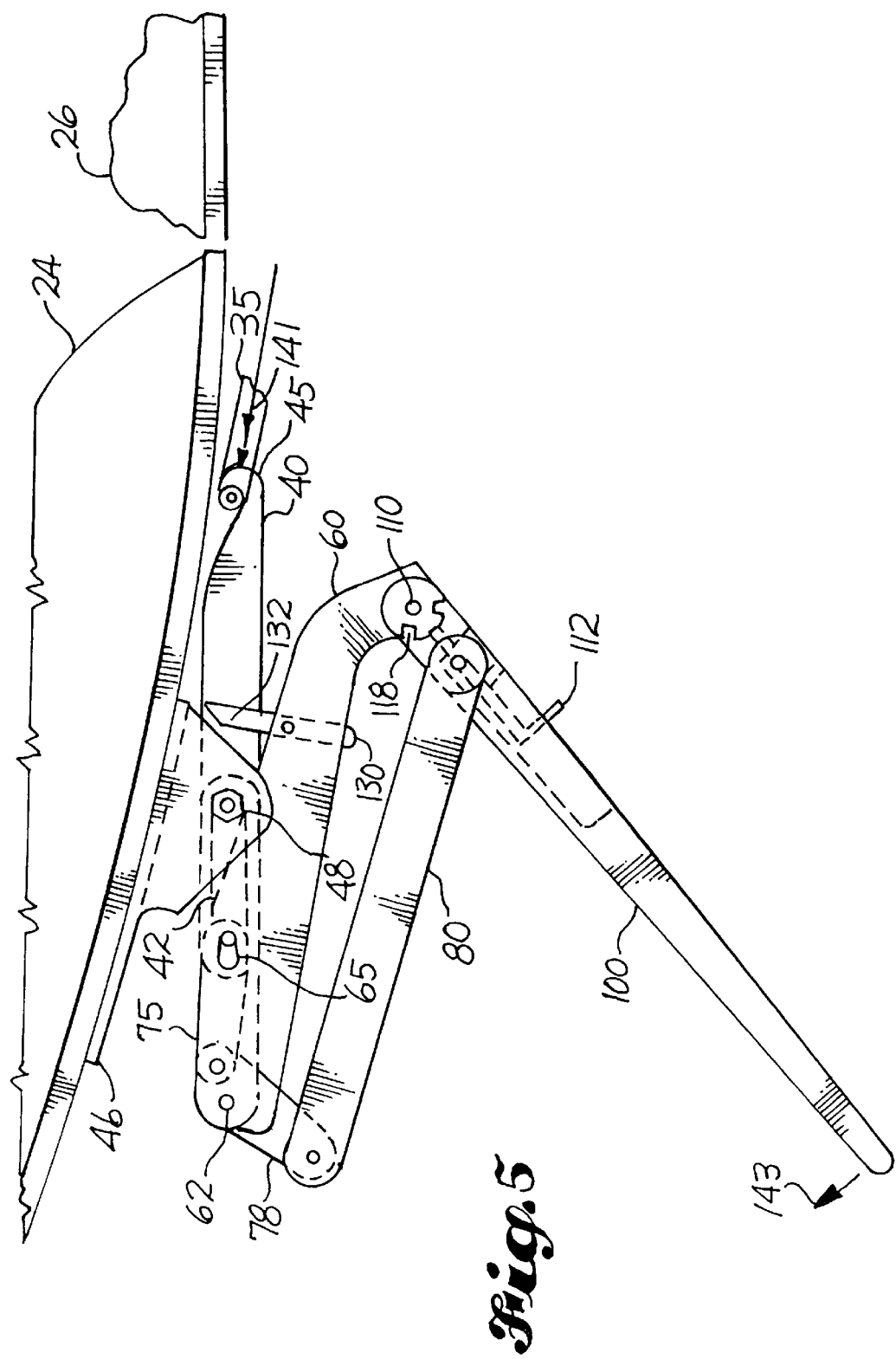
FIG. 5 is a rear elevational view of a latch in a partially closed position during the folding stroke.

Referring now to FIG. 5, once the inner handle release trigger 130 is securely engaged with the pin 132 on the hook arm, the outer handle release trigger 112 is slid back toward the end of the outer handle 100. With the outer handle release trigger 112 released, the outer handle 100, the inner handle 60, the idler link 80, the rocker link 78 and the secondary link 75 are all free to move and rotate in relation to each other as they remain pivotally connected. The hook arm 40 and the inner handle 60 are securely fixed to each other by the inner handle release trigger 130. During the folding stroke, the outer handle 100 is moved towards the left, clockwise, as shown by the arrow 142 in FIG. 5. This movement forces the idler link 80 to move toward the left, which forces the rocker link 78 to rotate about its pivotal connection to the hook arm 40 and the inner handle 60. As the rocker link 78 rotates, the hook arm 40 and the inner handle 60 are forced to the left as the secondary link 75 moves toward a position substantially parallel and in line with the hook arm 40. This movement allows the folding stroke to also do work and provide additional take-up. By dividing the desired take-up over the closing stroke and the folding stroke, the force needed for any one stroke is reduced while the take-up distance is maintained. The combination of strokes also enables a higher preload to be achieved without having to increase the necessary force for a single stroke.

Figure 6:
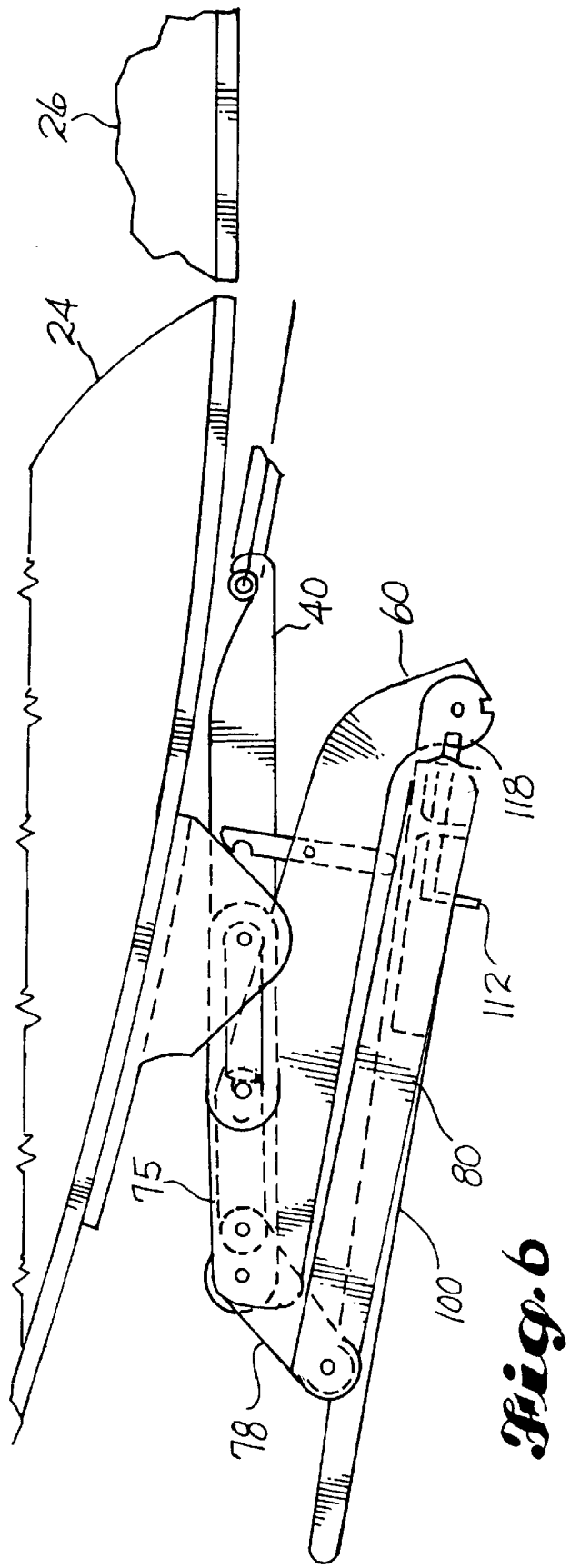
FIG. 6 is a rear elevational view of a latch in a closed, latched and locked position.

Referring to FIG. 6, an embodiment of the present latch is shown closed. The secondary link 75 is located substantially parallel and in line with the hook arm 40. The outer handle release trigger 112 is engaged into the detent 118 in the inner handle 60, securing the outer handle 100, the idler link 80, the rocker link 78, and the secondary link 75 so that they are in a fixed relative position and secured for normal engine operation.

Figure 7:
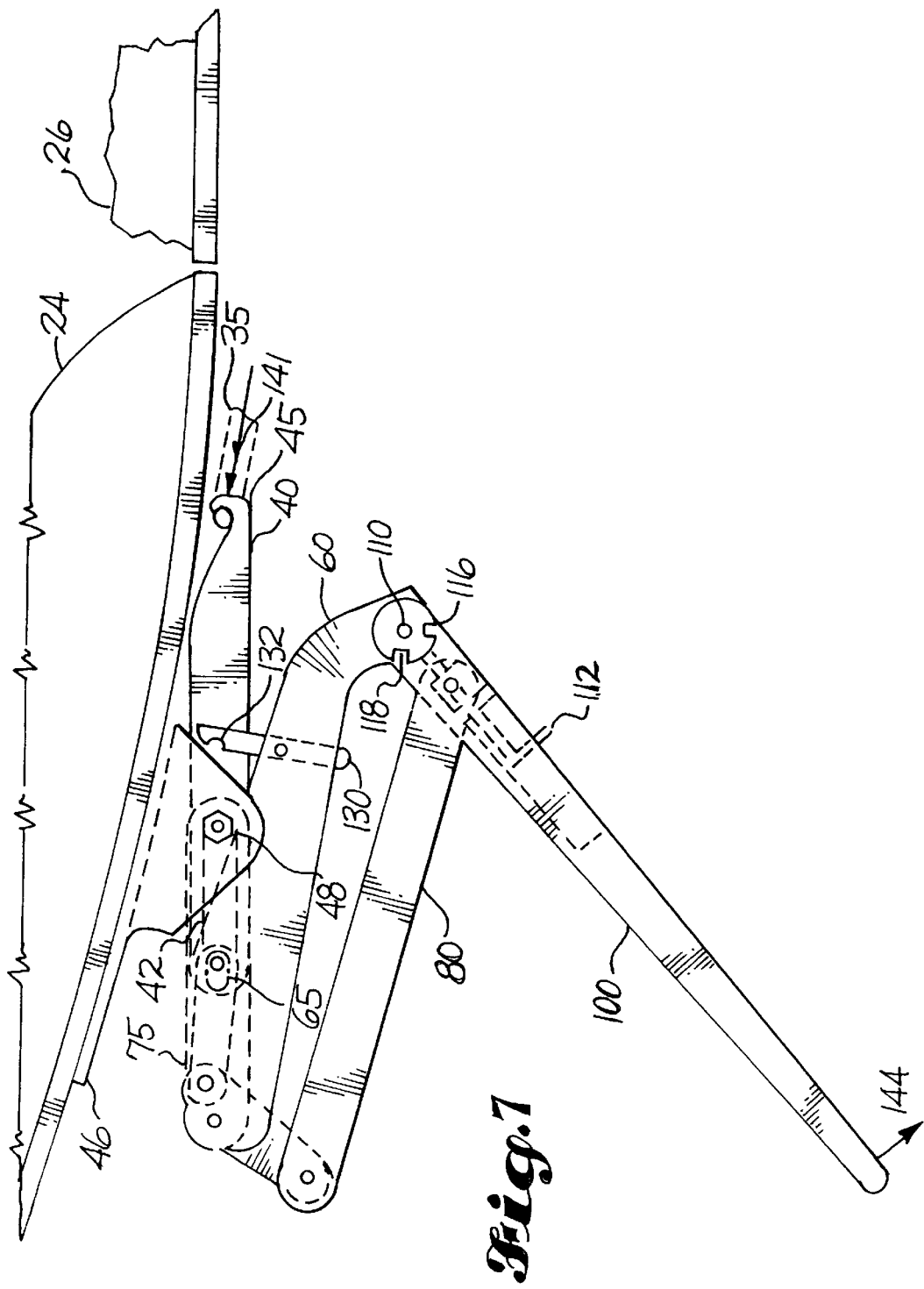
FIG. 7 is a rear elevational view of a latch in a partially open position during the unfolding stroke.
Figure 8:
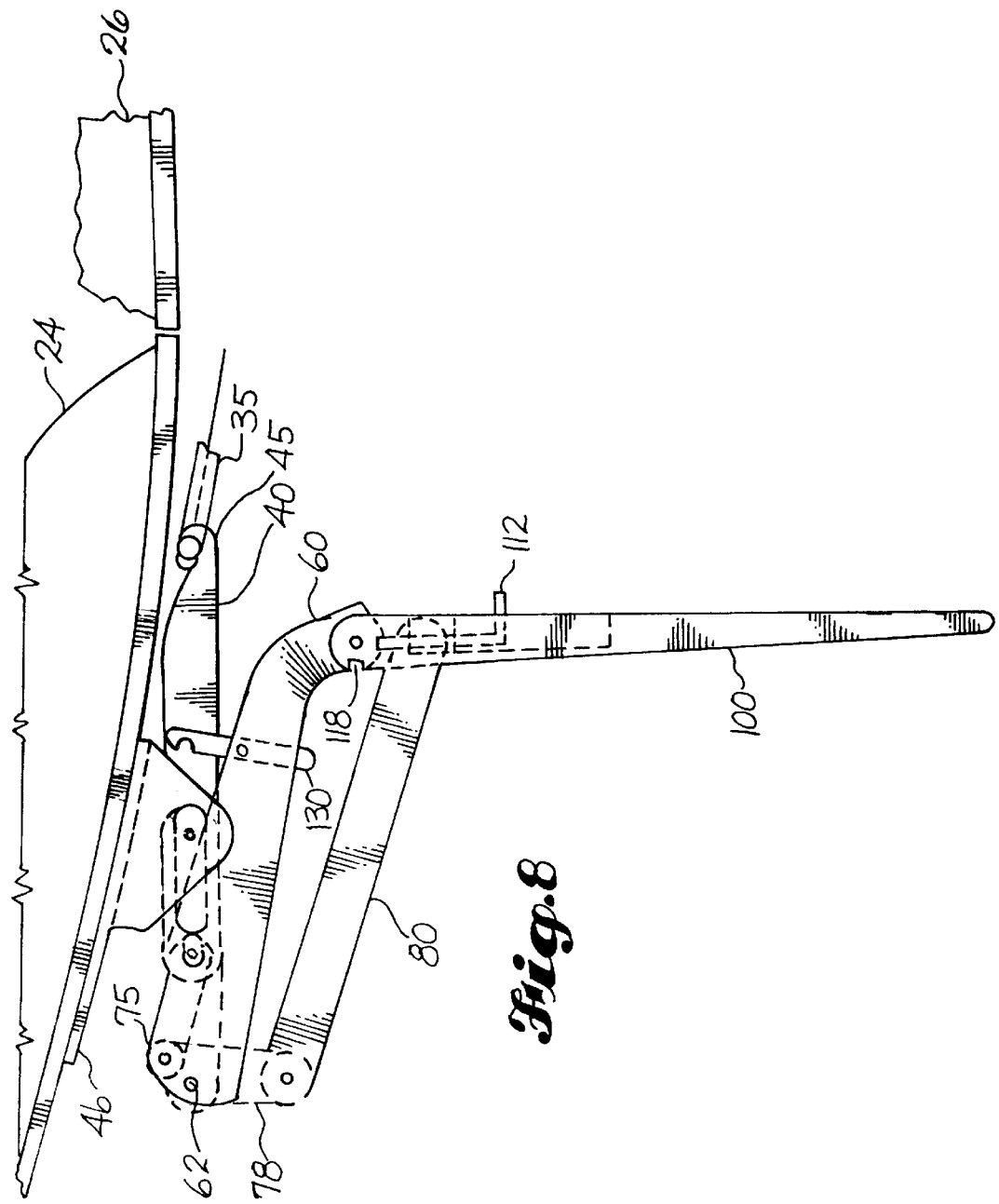
FIG. 8 is a rear elevational view of a latch prior to the final opening stroke.

The thrust reverser duct or cowling can be opened to access the engine for maintenance and repair. The outer handle release trigger 112 is released so that the outer handle 100 can be moved to the right, counter-clockwise, as shown by the arrow 144 in FIG. 7. The movement of the outer handle 100 will cause the idler link 80, the rocker link 78, and the secondary link 75 to move forcing the hook arm 40 to the right. The outer handle 100 continues to move until the outer handle release trigger 112 engages with the detent 116, as shown in FIG. 8. Once the outer handle release trigger 112 is engaged, the inner handle release trigger 130 can be released. The outer handle 100 can then be moved to the left, which forces the hook arm 40 further to the right until the hook 45 can be disengaged from the keeper 35 and the ducts 24 and 26 can be opened.

Although certain embodiments have been described above, the spirit and scope of the invention is by no means limited to those specific embodiments. It is therefore understood that the invention may be practiced otherwise than as specifically described yet within the scope of the claims attached hereto.

What is claimed is:

1. A latch for providing mechanical advantage over two strokes comprising:

a base, a keeper:

a hook arm for engaging said keeper, said hook arm attached to the base;

a first over center linkage attached to said hook arm; and a second over center linkage attached to said first over center linkage, wherein said second over center linkages comprises;

an outer handle pivotally connected to the inner handle;

an idler link connected to the outer handle;

a rocker link pivotally connected to the inner handle and the hood arm; and a secondary link pivotally connected between the rocker link and the primary link.

2. A latch for providing mechanical advantage over two strokes comprising:

an outer handle trigger, a closing handle unit formed when said outer handle trigger is engaged in a detent, a hook arm attached to said closing handle unit and engaged with a keeper, and a linkage formed by said closing handle unit pivotally connected to a primary link, said primary link pivotally connected a mounting base, wherein said closing handle unit comprises:

an inner handle, an outer handle connected to said inner handle, an idler link connected to said outer handle, a rocker link connected to said said idler link, said inner handle and said hook arm, a secondary link connected to said rocker link and said inner handle, said outer handle trigger engaged in said detent to secure said outer handle, said inner handle, said rocker link and said secondary link in substantially fixed relation to each other.

3. A latch as claimed in claim 2, further comprising:

an inner handle trigger engaged with said hook arm to secure said hook arm and said inner handle in a substantially fixed relation.

4. A method of closing a latch comprising:

engaging an outer handle release trigger with a first detent in an inner handle, locking an outer handle, an inner handle, an idler link, a rocker link and a secondary link in fixed relation forming a closing handle unit, forcing said closing handle unit in an arc toward a hook arm connected to a keeper, moving said hook arm, forcing a primary link connected between said hook arm and said inner handle into a position parallel to said hook arm to provide mechanical advantage, and engaging an inner handle release trigger with said hook arm.

5. A method of closing a latch as claimed in claim 4, further comprising:

releasing said outer handle release trigger, forcing said outer handle in an arc toward said inner handle joined to said hook arm, forcing said idler link attached to said outer handle to move, forcing said rocker link to rotate about a pivot connection with said hook arm and said inner handle, forcing said secondary link toward a position substantially parallel and in line with said hook arm, and drawing said keeper toward said mounting base.

* * * * *